(12) United States Patent
Paleos et al.

(10) Patent No.: US 7,767,091 B2
(45) Date of Patent: Aug. 3, 2010

(54) METHOD FOR ENCAPSULATING POLLUTANTS FROM WATER USING MODIFIED DENDRIMERIC POLYMERS

(75) Inventors: Constantinos Paleos, Kallithea (GR); Dimitrios Triourvas, Pikermi (GR); Oreozili Sideratou, Pefki (GR); Michael Arkas, Filothei (GR)

(73) Assignee: The National Center for Scientific Research "Demokritos", Attikis (GR)

( * ) Notice: Subject to any disclaimer, the term of this patent is extended or adjusted under 35 U.S.C. 154(b) by 1071 days.

(21) Appl. No.: 10/542,665

(22) PCT Filed: Jan. 21, 2004

(86) PCT No.: PCT/GR2004/000004

§ 371 (c)(1),
(2), (4) Date: Jan. 13, 2006

(87) PCT Pub. No.: WO2004/065459

PCT Pub. Date: Aug. 5, 2004

(65) Prior Publication Data

US 2006/0157418 A1    Jul. 20, 2006

(30) Foreign Application Priority Data

Jan. 21, 2003   (GR) .............................. 2003010020

(51) Int. Cl.
*C02F 1/28* (2006.01)
(52) U.S. Cl. ...................... 210/670; 210/692
(58) Field of Classification Search ................ 210/671, 210/680, 690, 691, 692, 693, 670
See application file for complete search history.

(56) References Cited

U.S. PATENT DOCUMENTS

| 3,812,031 | A | * | 5/1974 | McCoy et al. | 210/671 |
| 4,279,757 | A | * | 7/1981 | DeBeuckelaer et al. | 210/671 |
| 5,135,660 | A | * | 8/1992 | Chromecek et al. | 210/671 |
| 5,938,934 | A | * | 8/1999 | Balogh et al. | 210/688 |
| 6,455,071 | B1 | | 9/2002 | Shchepinov et al. | |
| 6,794,327 | B2 | * | 9/2004 | Youngs et al. | 502/152 |

FOREIGN PATENT DOCUMENTS

EP    0 928 813    7/1999

OTHER PUBLICATIONS

Tomalia et al, The Importance of Branch Junction Symmetry in the Development of Topological Shell Molecules, 1987, American Chemical Society, vol. 109, pp. 1601-1603.*

(Continued)

*Primary Examiner*—Matthew O Savage
(74) *Attorney, Agent, or Firm*—Porzio, Bromberg & Newman, P.C.

(57) ABSTRACT

The invention deals with lipophilic modified dendrimers and hyperbranched polymers that can encapsulate organic pollutants of a diversity of sizes and shapes and which are prepared following the modification of the functional groups present at the surface of the polymer. These functional polymers are characterized by the fact that their nanocavities do not have predetermined dimensions but their size and shape are affected by the size and shape of the pollutant they will encapsulate or otherwise they will be so-adjusted to it.

9 Claims, 11 Drawing Sheets

OTHER PUBLICATIONS

Figure 1:
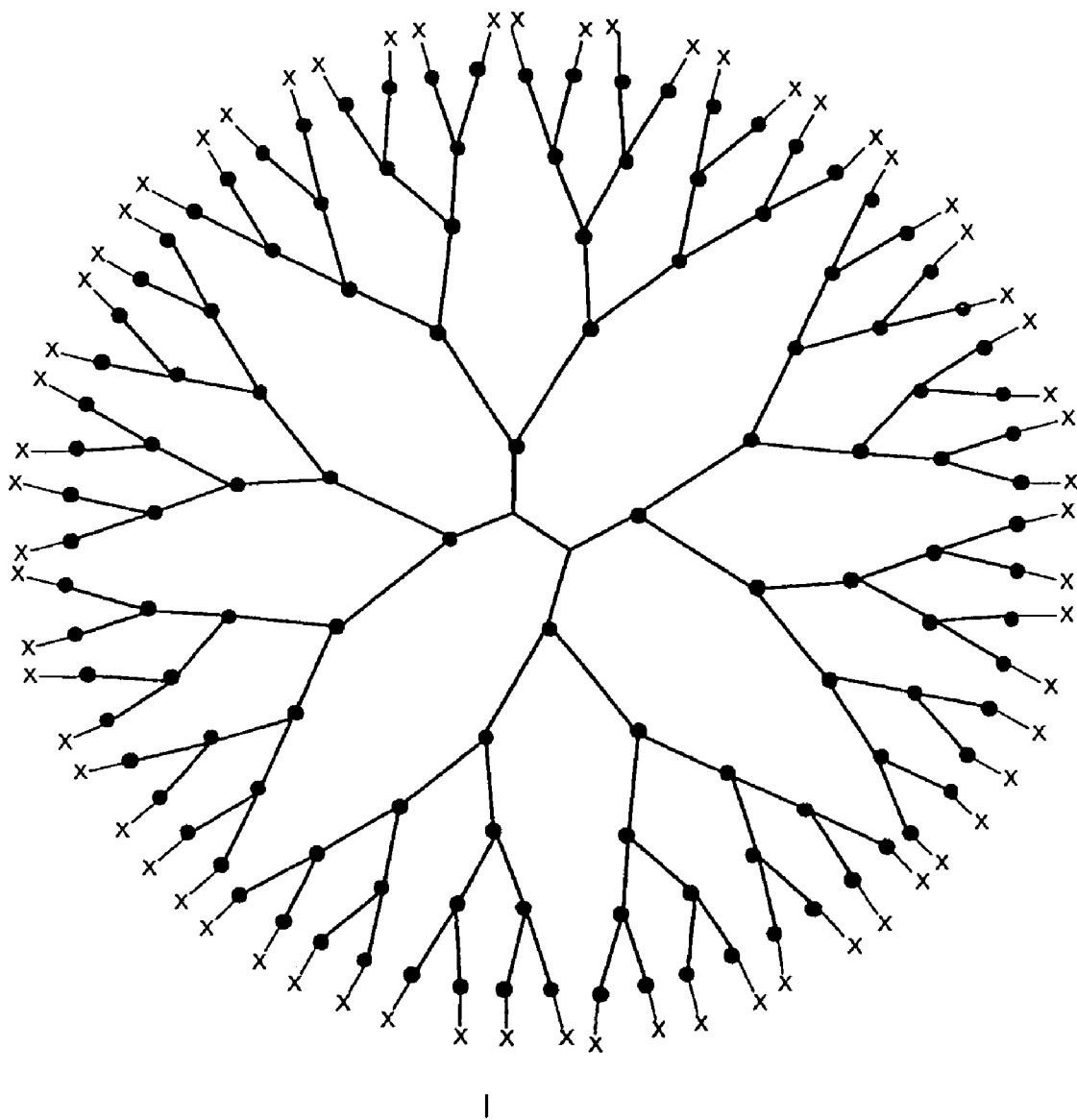

Tsiourvas et al., "Body-Centered-Cubic Derived from n-dodecyclurea Functionalized Poly(propylene imine) Dendrimers" Macromolecules, 35(5):1746-50 (2002).

Henrik Ihre and Anders Hult, "Double-Stage Convergent Approach for the Synthesis of Functionalized Dencritic Aliphatic Polyesters Based on 2,2-Bis(hydroxymethyl)propionic Acid" Macromolecules, 31:4061-68 (1998).

Sideratouz et al., "Quaternized Poly(propylene imine) Dendrimers as Novel pH-sensitive Controlled-release Systems" Langmuir, 16(4):1766-69 (2000).

Dan Luo et al., "Poly(ethylene glycol)-Conjugated PAMAM Dendrimer for Biocompatible High-Efficiency DNA Delivery" Macromolecules, 35:3456-62 (2002).

Sideratou et al., "A Novel Dendrimeric 'Glue' for Adhesion of Phosphatidyl choline-based Liiposomes" Langmuir, 18(13):5036-39 (2002).

Mingjun Liu et al., "Water-Soluble Dendrimer-Poly(ethylene glycol) Starlike Conjugates as Potential Drug Carriers" J. Poly. Sci., Part A: Poly. Chem., 37:3492-3503 (1999).

Arkas et al., "Functional Dendrimeric 'Nanosponges' for the Removal of Polycyclic Aromatic Hydrocarbons from Water" Chem Mat., 15(14):2844-47 (2003).

\* cited by examiner

METHOD FOR ENCAPSULATING POLLUTANTS FROM WATER USING MODIFIED DENDRIMERIC POLYMERS

RELATED APPLICATIONS

This is a National Stage of International Application Number PCT/GR2004/000004, filed Jan. 24, 2004, which claims priority from GR20030100020, filed Jan. 21, 2003.

TECHNICAL FIELD

The present invention deals with modified lipophilic polymers and specifically with the preparation of modified lipophilic dendrimeric and hyperbranched polymers and their application for encapsulating organic compounds contained in water and which are contributing to its pollution.

BACKGROUND OF THE INVENTION

The currently available and established methods for water purification do not have the capability of removing organic pollutants at the level of a few parts per billion (ppb). In contrast to the inorganic metal ions, the organic pollutants do not bind to the polymeric resins and do not solidify to mineral materials. The conventional methods of water purification employ either filtration through active carbon or reverse osmosis. Active carbon removes organic compounds, it however fails to remove a large number of organic pollutants at the level of a few ppb. Other materials such as zeolites have well-defined permeability but have little affinity to the organic compounds present in water. In addition active carbon and zeolites absorb moisture and therefore they are not effective in water. On the other hand, although reverse osmosis has been successfully used for the desalination of water, operation at high pressures is required, usually 20-100 bar, and as a consequence large energy consumption is required for achieving effective separation. It is also impossible to achieve 100% water recovery because pressure increases as more water is forced to pass through the dense membrane. For this reason the continuation of separation procedure becomes non-practical. In addition reverse osmosis cannot remove all small molecules from water because the membrane is not completely semipermeable. As a result a small concentration of organic molecules usually leaks to the purified water. More effective for water purification from organic pollutants is the preparation of modified lipophilic polymers bearing nanocavities and their application for encapsulating organic pollutants.

By now, known cases for the preparation of certain lipophilic polymers and their application for encapsulating organic compounds contained in water refer to modified cyclodextrin derivatives as described in the article entitled "New Organic Nanoporous Polymers and their Inclusion Complexes", Chem. Mater. 1999, 11, 872-874, among others. The disadvantage of these known modified polymers is that their nanocavities have in each case specific size and shape, which cannot be modified. The consequence of this disadvantage is that only specific organic pollutants can be encapsulated in specific cyclodextrin derivatives. Particularly, the molecule of the organic compound must in every case be smaller than or almost of similar size to the nanocavity of the cyclodextrin polymer and its shape should match to that of the cavity, in order that it is encapsulated and consequently that water purification is achieved. The result is that organic molecules that are large-sized or of irregular shape cannot be encapsulated into the cavities of any kind of cyclodextrin's. In order for water purification from organic pollutants to be effective by the use of modified cyclodextrins it is required a) each time to know the type of the organic compound contained in water that is to be purified, b) each time to prepare the appropriate polymer whose nanocavities will have the appropriate size in order to be able to encapsulate the organic molecules in question. It is therefore obvious that the above disadvantages make difficult water purification. Also the cost of water purification by the application of cyclodextrins is increased, because many different polymeric derivatives must be prepared so as to cover the very large variety of organic pollutants present in water. An additional disadvantage of these modified polymeric cyclodextrins is that they cannot encapsulate large organic pollutants because in any case they cannot have cavities with diameters larger than 11 Å. Consequently, when organic molecules with diameters larger that 11 Å are contained in water, water purification from organic pollutants cannot be effective by the application of cyclodextrin polymers. These pollutants will in every case remain in water, since cyclodextrins cannot have cavities of this size in order to encapsulate these molecules.

An objective of the present invention is to provide modified lipophilic polymers which can encapsulate organic pollutants of a great variety of sizes and shapes and in any case of a greater variety than those that cyclodextrins can encapsulate.

The modified lipophilic dendrimeric and hyperbranched polymers, which are objectives of the present invention are prepared through modification of the functional groups that are located at their surface; the characteristic of these polymers is that the nanocavities that they form are not predetermined. These nanocavities are induced by the size of the pollutants that will be encapsulated, or alternatively they will adjust to the size of these molecules.

Therefore, an advantage of the modified lipophilic dendrimeric and hyperbranched polymers which constitute the object of the present invention is that they can be used for the absorbance/encapsulation of lipophilic pollutants, i.e. molecules of a large variety of sizes and shapes. This is due to the flexibility of the segments of the polymer from the surface of the molecules onwards to the end of the lipophilic chains, and also under the surface of the molecules in question (on the dendrimeric scaffold of the molecules). This flexibility results in the successful encapsulation of a large variety of organic lipophilic pollutants of different kinds and of different shapes in each material (modified lipophilic dendrimeric and hyperbranched polymer) that we prepare and use. Further, it is possible to use the same material for the removal of organic pollutants of a large diversity of sizes and shapes.

In addition, the modified lipophilic dendrimeric and hyperbranched polymers which constitute an object of the present invention can effectively be used for the encapsulation of lipophilic pollutants, the molecules of which may have diameters larger than 11 Å.

SUMMARY OF THE INVENTION

The present invention deals with modified dendrimers of the general formula (I) as shown in FIG. 1, which have symmetric chemical structure and are also stable solid materials. Such modified dendrimeric polymers are, for example, the diaminobutane poly(propylene imino) dendrimers modified with lipophilic segments.

Figure 2:
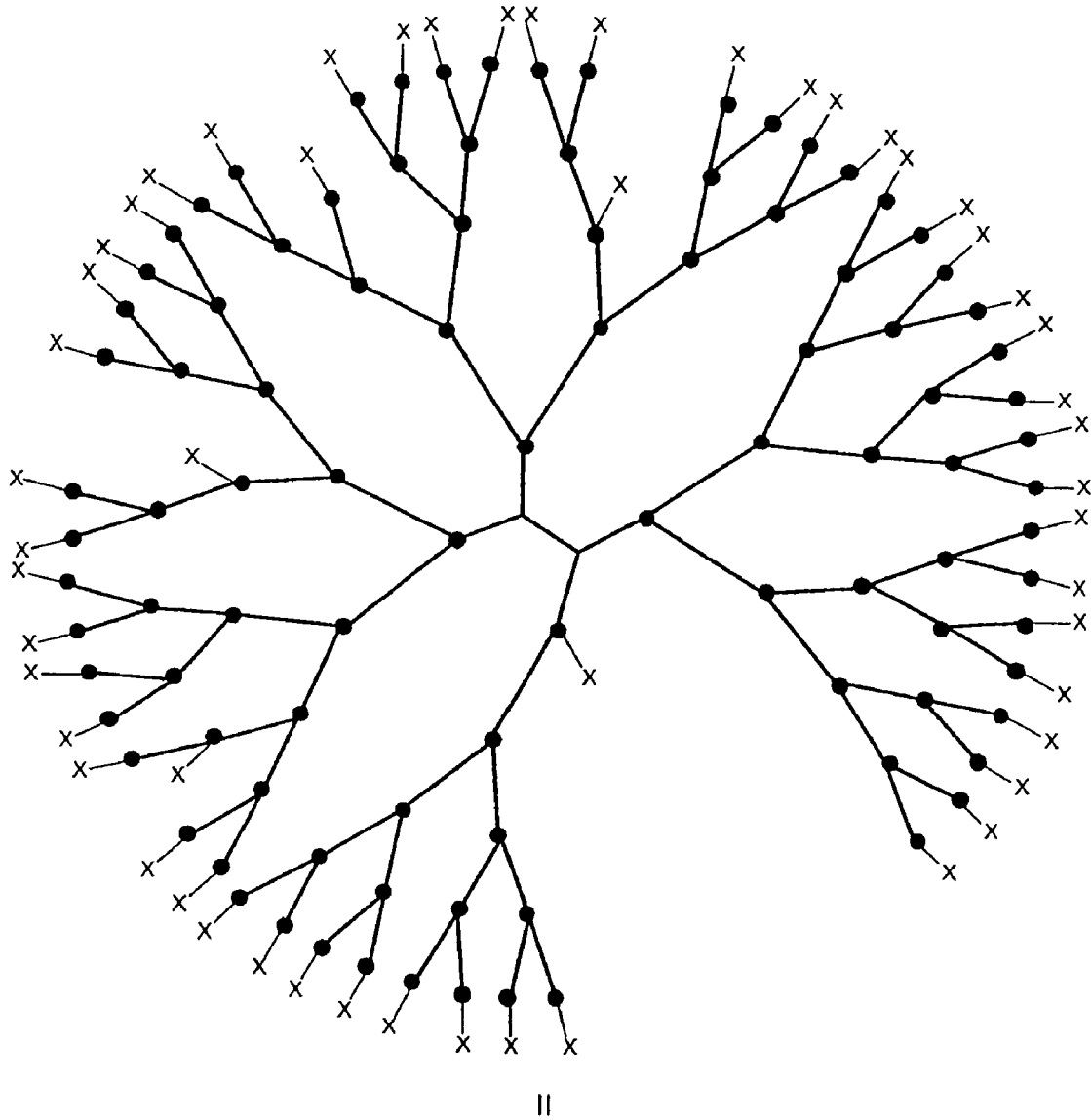

Also, the present invention deals with modified non-symmetric hyperbranched polymers of the general formula (II) as shown in FIG. 2. Such modified hyperbranched non-symmetric polymers are, for example, the derivatives that result from the polycondesation of succinic, pthallic or tetrahydropthalic anhydride with diisopropanolamine.

For the symmetric modified dendrimeric polymers of the general formula shown in FIG. 1 and also for the non-symmetric hyperbranched polymers of the general formula shown in FIG. 2, the symbol (●) can be an atom of a chemical element able to form three or more chemical bonds, as for instance nitrogen, or appropriate characteristic group. The straight line (-) can be inorganic or organic (aromatic or aliphatic or their combination) linking group and (X) can be any long aliphatic chain or an aromatic group or their combination which are attached following an appropriate chemical process in order to render the polymer lipophilic, as for instance, normal or branched aliphatic chain with more than eight carbon atoms.

The stable functional materials of modified dendrimeric and/or hyperbranched polymers, which are prepared by the present invention have the property to decrease the concentration of organic lipophilic pollutants of a great variety of sizes and shapes in water to the level of a few ppb and more specifically to the level of 5 ppb. For example, with the application of modified lipophilic dendrimeric and hyperbranched polymers which we are describing and which are an object of the present invention, the encapsulation of organic pollutants ranging from simple hydrocarbons (for instance benzene) to polyaromatic compounds (for instance pyrene) is achieved. It is therefore obvious that the above mentioned modified dendrimeric and hyperbranched polymers can be applied especially effectively for the purification of water from lipophilic organic pollutants. The water which is purified with the application of the above modified polymers is ultra pure and indispensable, among others, for use in pharmaceutical industries and in microelectronic industry.

Furthermore, an object of the invention is a method of synthesis of the above modified lipophilic dendrimeric and hyperbranched polymers. In addition, the present invention describes application methods of the above mentioned dendrimeric and hyperbranched polymers for water purification from organic pollutants and also methods for removal of these polymers from water together with the pollutants that they have encapsulated.

Furthermore, the same dendrimeric and hyperbranched polymers after being used for the purification of water can be regenerated from the organic pollutants which they have encapsulated, and they can therefore be used again several times.

DESCRIPTION OF THE INVENTION

The preparation of the above mentioned modified dendrimeric or hyperbranched polymers, which constitute an object of the present invention, was achieved with the modification of the functional groups, which are located at the surface of these polymeric molecules. Specifically, long aliphatic chains were attached at the surface of dendrimeric and hyperbranched polymers in order to render the modified polymers lipophilic. Similarly, the same results were obtained by cross-linking the above mentioned dendrimeric or hyperbranched polymers with aliphatic or rigid aromatic moieties rendering the modified polymers lipophilic.

The lipophilic character and consequently the insolubility of dendrimeric or hyperbranched polymeric derivatives in water is necessary in order to exclude the possibility that the latter polymers of becoming "pollutants" because of their solubility or dispersion in water.

As a result of this process, the above mentioned polymers in addition to their insolubility in water they also exhibit nanocavities in their interior, into which organic impurities are encapsulated. These nanocavities are created by the internal chains of the dendrimers but also from the aliphatic chains that are attached at their surface.

In this manner, according to the present invention, stable functional materials originating from modified dendrimers or hyperbranched polymers are prepared which can reduce the concentration of organic pollutants of water at the level of a few ppb and more specifically to the level of 5 ppb. Due to the flexibility of the segments which constitute the modified polymers and which favor the formation of nanocavities, it is possible to encapsulate organic pollutants with a diversity of shapes and sizes.

Figure 3:
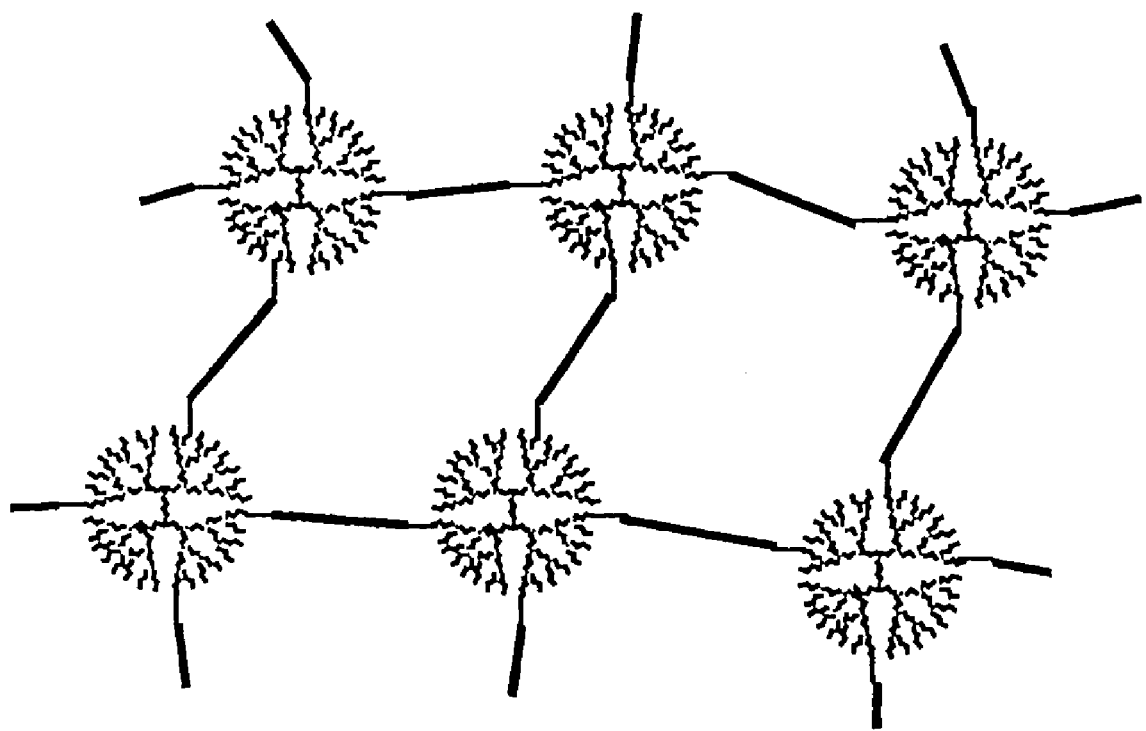

The present invention provides also a method for the production of the above mentioned materials, according to which dendrimeric or hyperbranched polymers become insoluble in water due to the introduction of long aliphatic chains employing facile synthetic processes. For example, this process is achieved by the reaction of surface amino groups or hydroxy groups of dendrimers or hyperbranched polymers with reagents bearing long aliphatic chains or aromatic derivatives also bearing reactive groups such as epoxide, isocyanate or acyl halide moieties. This is also achieved by the formation of polymeric networks materials based on the starting dendrimers or hyperbranched polymers employing reagents such as diepoxides, diisocyanate derivatives or diacylhalides as shown in FIG. 3. According to this method a dendrimeric or a hyperbranched polymer is dissolved in dry chloroform, cooled in an ice bath and to this solution is slowly added an excess of isocyanate, disocyanate, epoxide, diepoxide, acylhalide or diacylhalide derivative under an inert Argon atmosphere. To this reaction mixture a catalyst can also be added as for instance 4-dimethylamino pyridine and the mixture is allowed to reach to environmental temperature. It is stirred for several hours and subsequently the product is precipitated by an appropriate solvent and dried.

Typical dendrimers or hyperbranched polymers, which were used are the diamino poly(propylene imino) dendrimers of the fourth and the fifth generation and hyperbranched polymers that result from the polycondensation of succinic, pthallic and tetrahydropthalic anhydride with isopropanolamine. These materials do not limit the range of the application of the present invention, since any dendrimer or hyperbranched polymer can be used as a basic starting material and can be modified according to the principles, which are described in the present invention.

Epoxide, isocyanate and acylhalide derivatives are considered the epoxide, isocyanate and acylhalide derivatives, which bear aromatic groups or have long aliphatic chains or any combination of them. Specifically in the present invention octadecyl isocyanate was used. Diepoxides, disocyanates and diacylhalides are all the diepoxide, disocyanate and diacylhalide derivatives, aromatic or aliphatic in which the two epoxy or isocyanate or acylhalide groups are located at the end of the molecule.

Furthermore in the present invention are described methods of the application of the above mentioned dendrimeric and hyperbranched polymers which are objects of the invention for the purification of water from organic pollutants as well as methods for the removal of polymers together with encapsulated pollutants from water.

A first method of application is the use of a small quantity of powdered lipophilic polymeric derivative that is added to water for purification and which is stirred for several hours. Afterwards, the lipophilic derivative which has encapsulated the organic pollutants is removed by filtration or centrifugation or a combination of filtration and centrifugation.

In a second method of application, the container in which the water for purification will be added, is covered with a thin film, which is prepared from one of the lipophilic dendrimeric or hyperbranched polymers. The coverage of the container with the lipophilic film is achieved by the dissolution of the polymer to a non-polar solvent, preferably chloroform and slight heating. It is followed by removal of the solvent with slow evaporation and continuous stirring: Subsequently the water is added to the container, stirred for several hours and subjected to centrifugation or filtration in order to remove pieces of the film, which possibly have been detached from the surface of the container.

An additional method of application is the impregnation of ceramic filters with the lipophilic dendrimeric or hyperbranched polymers. This impregnation can be achieved by three methods: Simple placing of the ceramic filters to a solution of the lipophilically modified dendrimeric or hyperbranched polymers, immersion and application of ultrasonic waves and finally passing a hot solution of lipophilic polymer through the ceramic filter. The impregnated ceramic filters are subsequently used for the purification of water through filtration.

Furthermore, according to this invention the lipophilic dendrimeric or hyperbranched polymer has the property of regeneration following its application. The interior of nanocavities of lipophilic derivatives becomes easily hydrophilic following its protonation with strong acids, preferably with hydrochloric acid. The protonated derivatives of polymers are freed almost quantitatively from the organic pollutants. Subsequently the protonated hydrophilic derivative can be converted again to the lipophilic initial derivative with the addition of a base and can be regenerated with filtration.

A second method of regeneration of lipophilic dendrimeric and hyperbranched polymers, which have impregnated ceramic filters, is by treating them with hot solvent, which does not dissolve the dendrimer; however, It dissolves lipophilic organic pollutants that have been absorbed in their nanocavities.

The examples that follow are given so as to further illustrate the application of the present invention. It must be noted that the "parts" mentioned in the following examples are in moles.

EXAMPLE 1

Synthesis of a Lipophilic Dendrimeric Polymer

One part of diaminobutane poly(propylene imino) dendrimer of the fourth generation (DAB-32) was dissolved in dry dichloromethane and cooled in ice-water bath. Thirty-six parts of n-octadecyl isocyanate were dissolved in dry dichloromethane and were slowly added under continuous stirring while argon was conducted in the solution. Half an hour following the addition the solution was allowed to reach room temperature and was kept under stirring for several hours. The product of the reaction was precipitated with the addition of methanol and was separated with centrifugation. Subsequently, it was washed several times with methanol, was again subjected to centrifugation and dried. The structure of the product of the formula III shown in FIG. 4 was established with NMR spectroscopy (Table 1)

TABLE 1

Chemical shifts of the NMR spectrum of the lipophilic dendrimeric polymer

| Characteristic group (see formula I) | Chemical shift (ppm) |
|---|---|
| N$\underline{H}$CONH | 6.40 |
| NHCON$\underline{H}$ | 6.00 |
| C$\underline{H}_2$NHCONHC$\underline{H}_2$ | 3.15 |
| NC$\underline{H}_2$CH$_2$C$\underline{H}_2$N | 2.34 |
| NC$\underline{H}_2$CH$_2$CH$_2$C$\underline{H}_2$N | |
| NC$\underline{H}_2$C$\underline{H}_2$CH$_2$NHCONH | |
| NC$\underline{H}_2$C$\underline{H}_2$CH$_2$N | |
| NC$\underline{H}_2$C$\underline{H}_2$CH$_2$CH$_2$N | 1.55 |
| NC$\underline{H}_2$C$\underline{H}_2$CH$_2$NHCONH | |
| NHCONHCH$_2$C$\underline{H}_2$CH$_2$ | 1.44 |
| NHCONHCH$_2$CH$_2$(C$\underline{H}_2$)$_9$CH$_3$ | 1.23 |
| CH$_3$ | 0.85 |

EXAMPLE 2

Synthesis of a Lipophilic Hyperbranched Polymer

Figure 5:
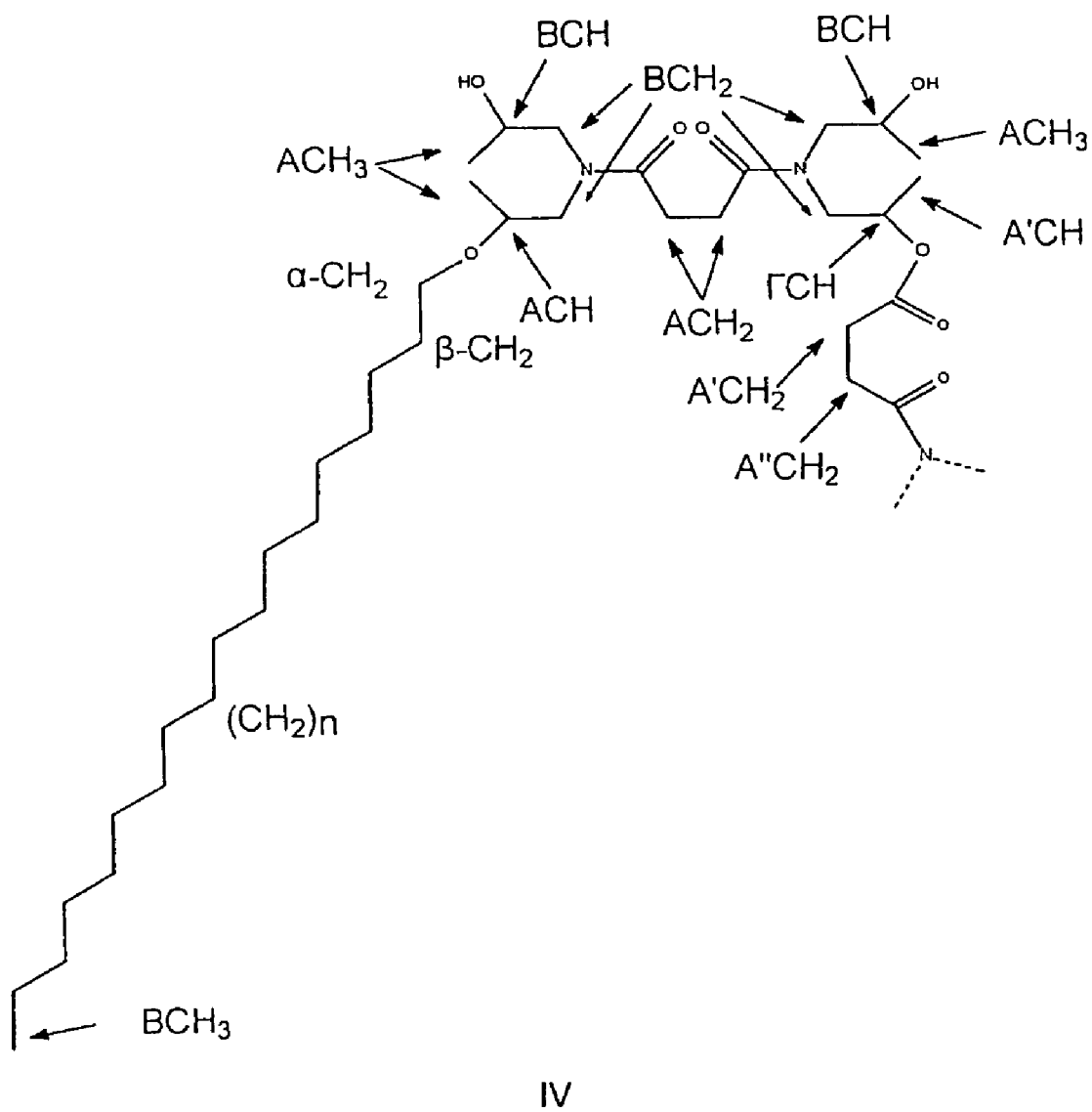

Hyperbranched polymer (1.1 parts) that was prepared by the polycondensation of succinic anhydride and diisopropanolamine and which had an average molecular weight of 1200, was dissolved in dry chloroform in which 3 parts of N,N 4-dimethylamino pyridine were added and cooled into an ice-bath. To this solution 12 parts of n-octadecyl isocyanate, dissolved in the same solvent were drop-wise added in an inert atmosphere. After half an hour the solution was allowed to reach room temperature and remained at this temperature for several hours. The product of the reaction was precipitated with acetonitrile and separated by centrifugation. Subsequently it was washed several times with methanol, was again subjected to centrifugation and dried. The structure of the product of formula IV, which is shown in FIG. 5 was established with NMR spectroscopy (Table II).

TABLE 2

Chemical shifts of the NMR spectrum of the lipophilic hyperbranched polymer

| Characteristic Group (see formula IV) | Chemical Shift (ppm) |
|---|---|
| ACH$_3$ | 1.21 |
| A'CH$_3$ | 1.40 |
| BCH$_3$ | 0.91 |
| ACH$_2$ | |
| A'CH$_2$ | 2.46-2.57 |
| A''CH$_2$ | |
| BCH$_2$ | 3.33-3.44 |
| α-CH$_2$ | 3.37 |
| β-CH$_2$ | 1.46 |
| n(CH$_2$) | 1.29 |
| ACH | 3.64 |
| BCH | 4.02 |
| Γ CH | 4.76 |

EXAMPLE 3

Synthesis of a Polymeric Network from Dendrimeric Polymers

One part of diaminobutane poly(propylene imino) dendrimer of the fifth generation (DAB-64) was dissolved in dry dichloromethane and cooled into an ice-bath. 6 parts of diisocyanohexane were dissolved in dry dichloromethane and were added drop-wise under continuous stirring in the dendrimeric solution under an argon atmosphere. Half an hour after the addition, the solution was allowed to reach room temperature and was stirred for several hours. Subsequently, methanol was added to the reaction solution and the product of the reaction was isolated by filtration. It was washed with methanol and dried. The structure of the polymeric network with dendrimeric polymers is shown in FIG. 3.

EXAMPLE 4

Figure 6:
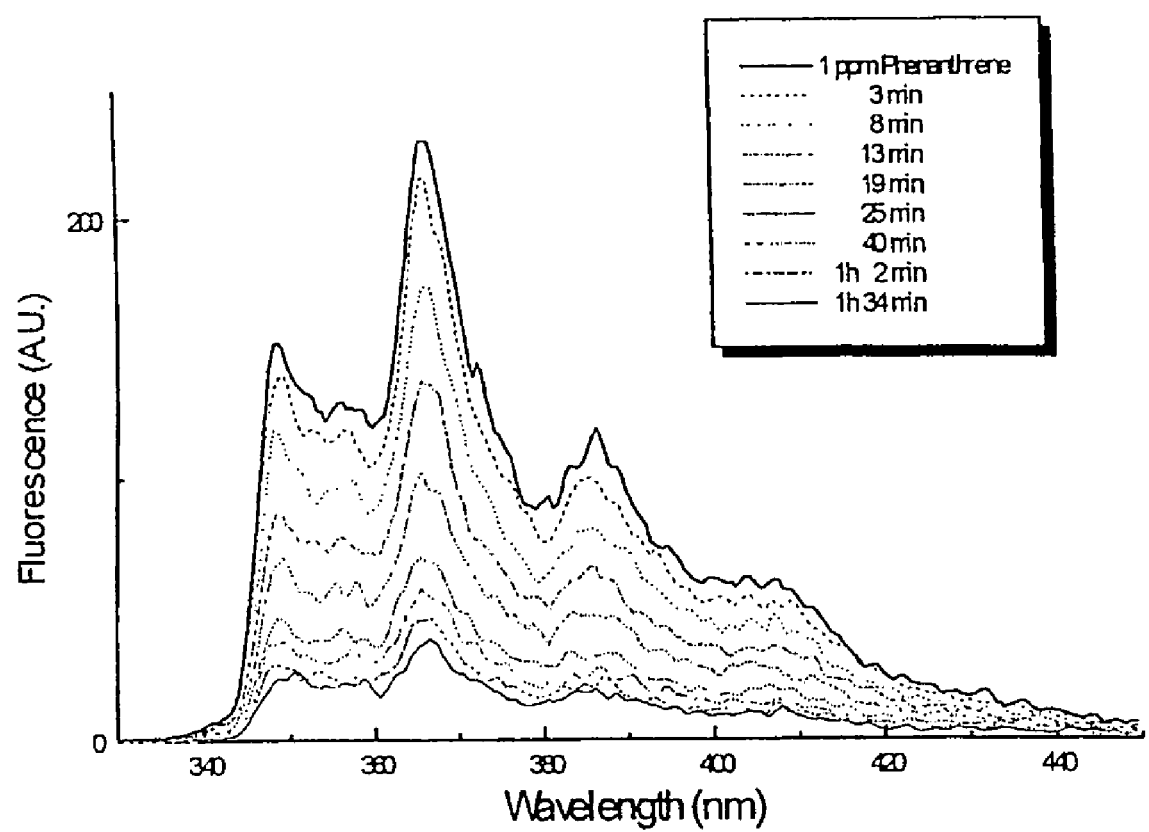
Figure 7:
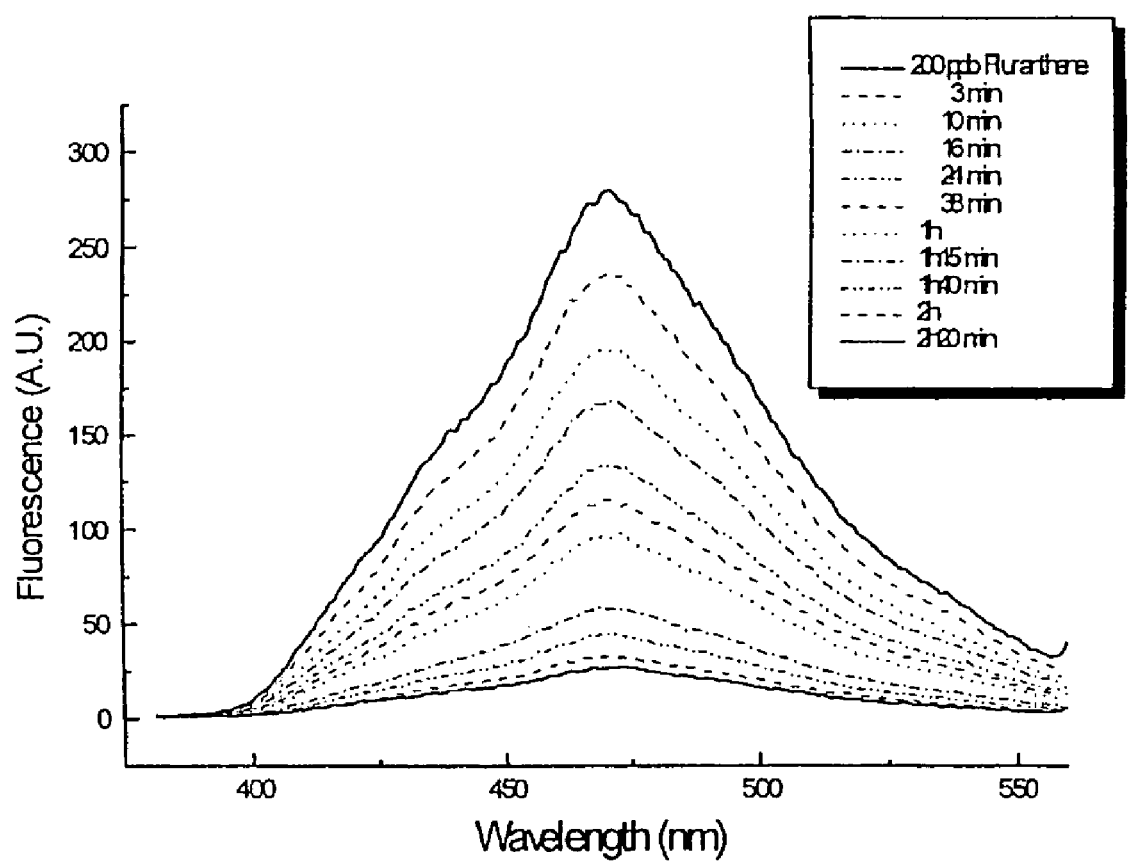
Figure 8:
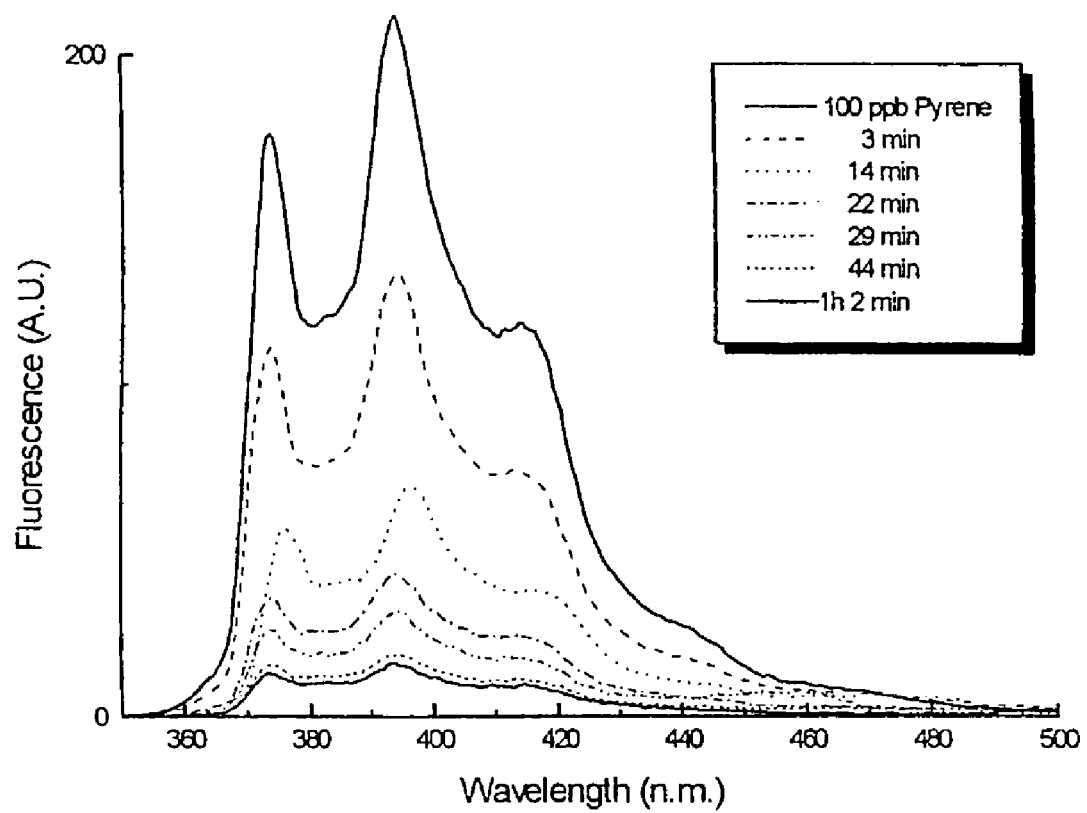

Method of Purification of Water from Organic Pollutants by the Use of Polymeric Films Spherical flasks were covered with a thin film prepared from modified dendrimeric or hyperbranched polymer through slow evaporation, under rotation, of a 0.5% chloroform solution. Subsequently in the flasks were added 50 ml of distilled water in which organic pollutants were added. At certain intervals the concentration of organic pollutants was determined by fluorescence spectroscopy. As shown in FIGS. 6-8 almost complete removal of organic pollutants was observed over a period of two hours.

EXAMPLE 5

Figure 9:
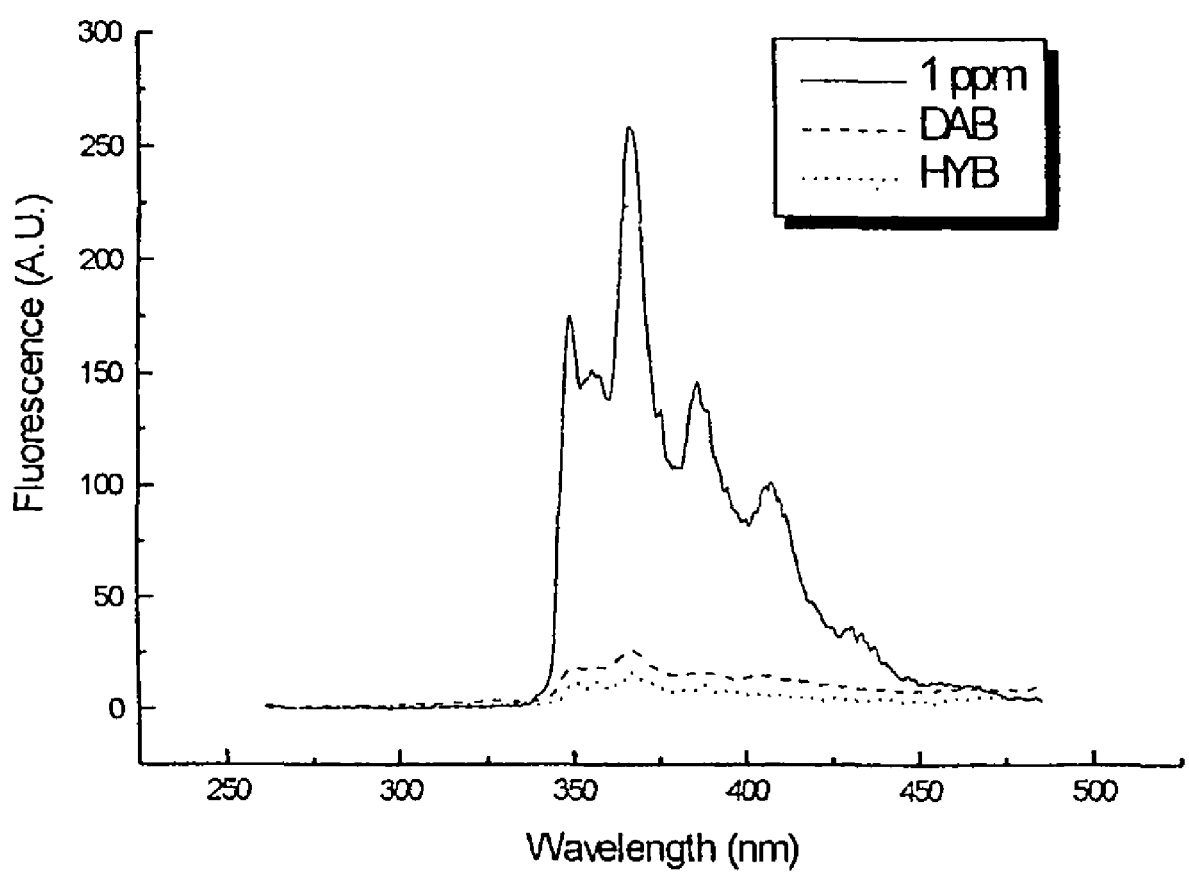
Figure 10:
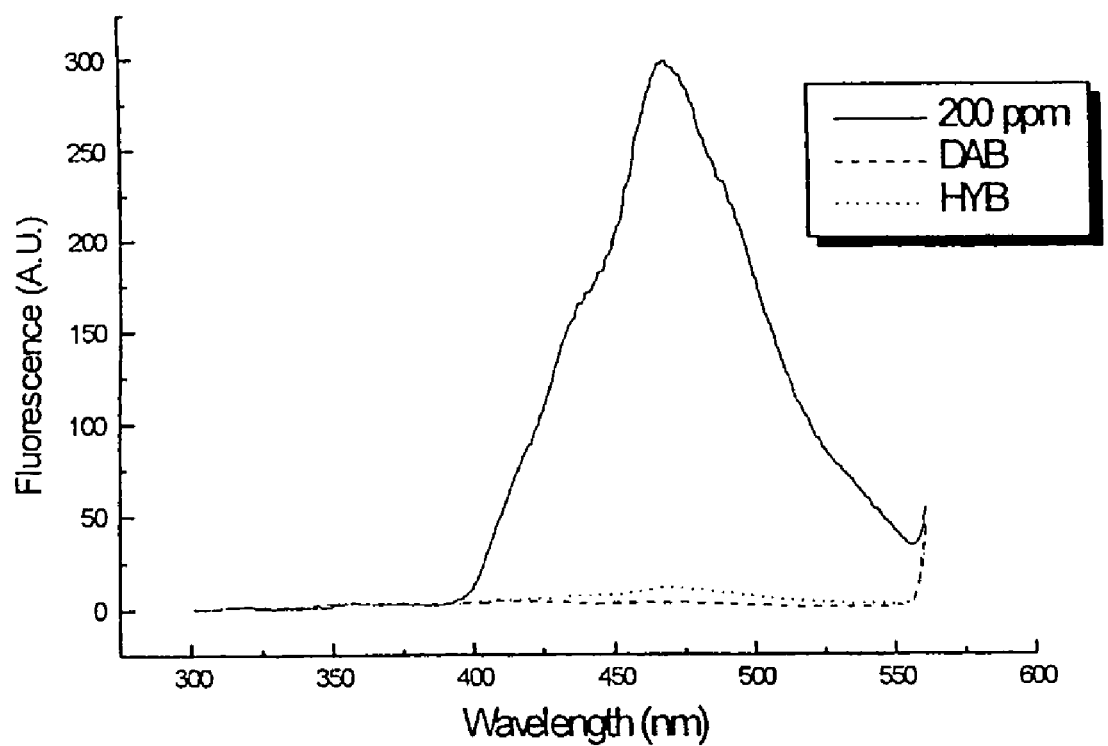
Figure 11:
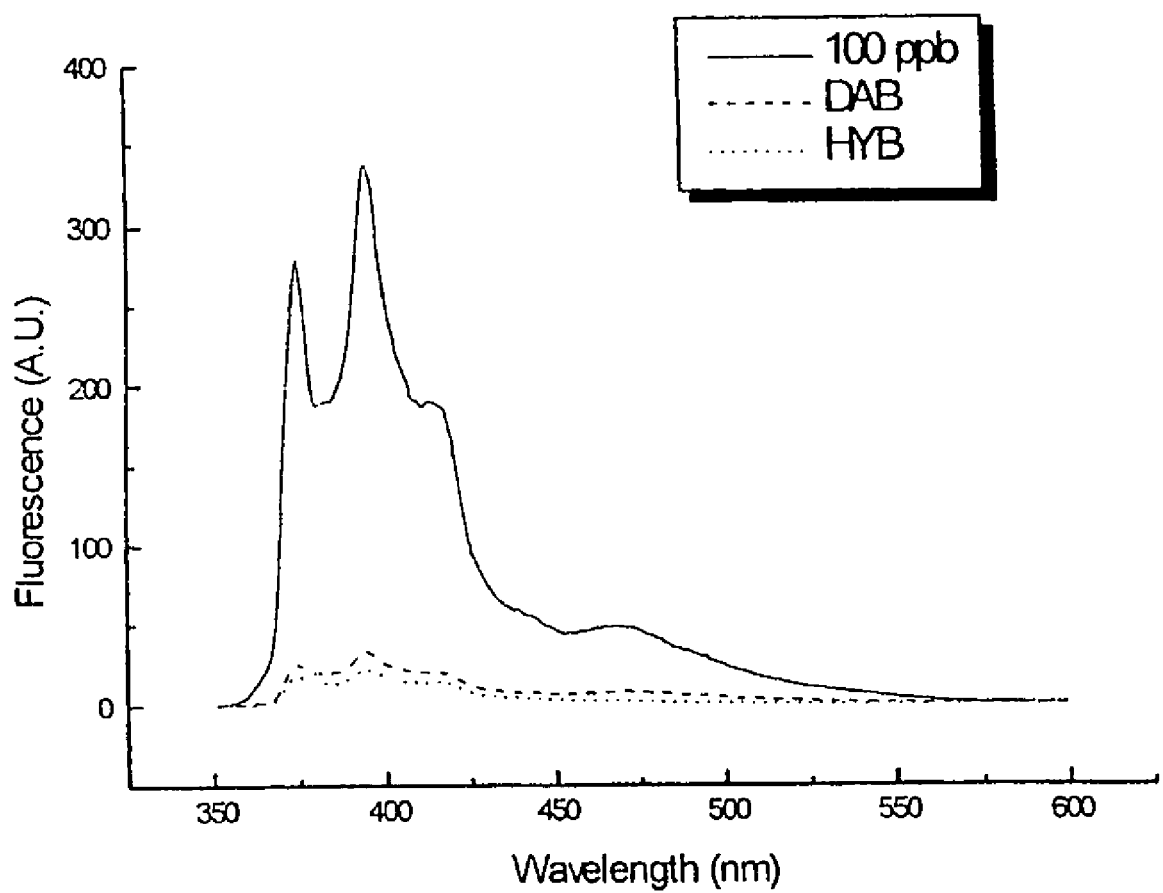

Method of Purification of Water from Organic Pollutants by Employing Impregnated Ceramic Filters Impregnation of the ceramic filters was achieved by passing a solution of the polymers i.e. of the derivatives of examples 1 or 2 through these filters. Subsequently the filter was dried under vacuum in order to remove the solvent. The water for purification was passed through the impregnated filter. Fluorescence experiments that were performed using water that contained polyaromatic pollutants showed that the percentage of encapsulation ranged from 93% for pyrene to 99% for phenanthrene and fluoranthene (FIGS. 9, 10, 11).

DETAILED DESCRIPTION OF THE FIGURES

FIG. 1 shows schematically a molecule of the general formula of a symmetric dendrimeric polymer which is an object of the present invention where the symbol (●) can be an atom of a chemical element able to form three or more chemical bonds, as for example nitrogen, or another appropriate characteristic group, the straight line (-) denotes inorganic or organic (aromatic or aliphatic or their combination) linking group and (X) any long aliphatic chain or aromatic group or their combination which is added in order to render the polymer lipophilic, as for instance a normal or branched aliphatic chain with more than eight carbon atoms.

FIG. 2 shows schematically a molecule of the general formula of a non-symmetric hyperbranched polymer which is an object of the present invention where as in the case of FIG. 1, the symbol (●) can be an atom of a chemical element able to form three or more chemical bonds as for example nitrogen, or another appropriate characteristic group, the straight line (-) denotes inorganic or organic (aromatic or aliphatic or their combination) linking group and (X) any long aliphatic chain or aromatic group or their combination, which is added for rendering the polymer lipophilic, as for instance a normal or branched aliphatic chain with more than eight carbon atoms.

In FIG. 3 is shown a schematic representation of a polymeric network, which consists of modified dendrimeric molecules. The straight line (-) is an organic (aromatic or aliphatic or their combination) linking group.

Figure 4:
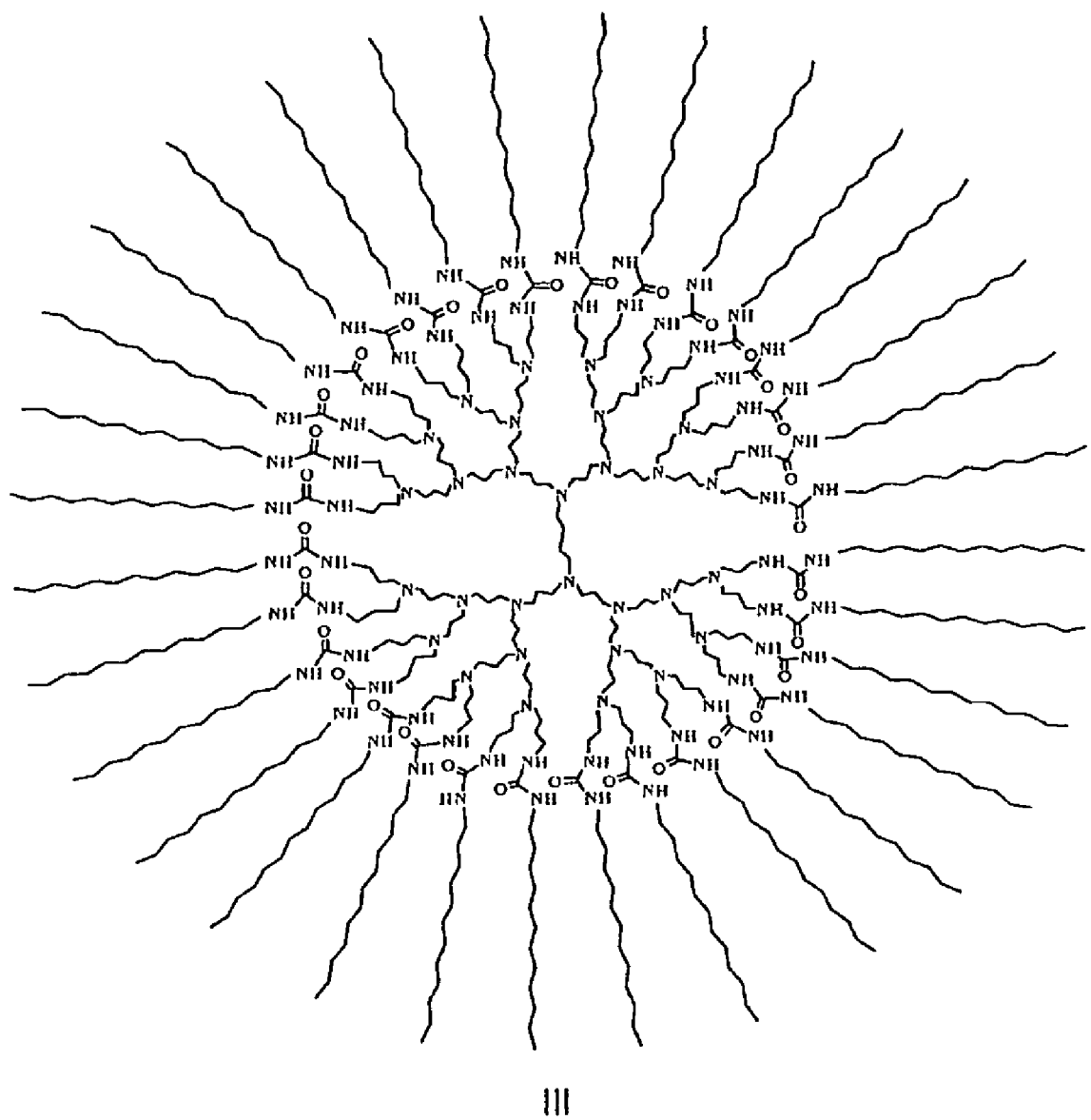

In FIG. 4 is shown a modified polymeric molecule of diaminobutane poly(propylene imino) dendrimer of the fourth generation (DAB-32).

In FIG. 5 is shown a segment of the general formula of a modified hyperbranched polymer (HYB) in which the hydrogens that correspond to different peaks of the nuclear magnetic resonance spectrum (NMR) are indicated.

In FIG. 6 is shown the fluorescence of a phenanthrene solution as a function of time after the introduction of a solution containing 1 ppm in a flask covered by a thin film, which film consists of lipophilic octadecylurea DAB-64 dendrimer. It is obvious that with increasing time, the concentration of phenanthrene in water is reduced due to its absorption into the film of the polymer.

In FIG. 7 is shown the fluorescence of a fluoranthene solution as a function of time after the introduction of a solution containing 200 ppb in a flask covered by a thin film consisting of lipophilic octadecylurea DAB-64 dendrimer. It is obvious that with increasing time the concentration of fluoranthene in water is reduced due to its absorption into the film of the polymer.

In FIG. 8 is shown the fluorescence of a pyrene solution as a function of time after the introduction of a solution containing 100 ppb in a flask covered by a thin film consisting of lipophilic octadecylurea DAB-64 dendrimer. It is obvious that with increasing time the concentration of pyrene in water is reduced due to its absorption in the film of the polymer.

In FIG. 9 is shown the fluorescence of a phenanthrene solution before and after filtration through a filter impregnated with the lipophilic octadecylurea, DAB-64 dendrimeric polymer and with the lipophilic n-octadecylurethane hybrane, hyperbranched polymer derivative (HYB). The solution before filtration had a concentration of 1 ppm.

In FIG. 10 is shown the fluorescence of a fluoranthene solution before and after filtration through filters impregnated with the lipophilic octadecylurea DAB-64 dendrimeric polymer and with the lipophilic n-octadecylurethane hybrane hyperbranched polymer derivative (HYB). The solution before filtration had a concentration of 200 ppb while after filtration the concentration was at least 10 times lower.

In FIG. 11 is shown the fluorescence of a pyrene solution before and after filtration through filters impregnated with the lipophilic octadecylurea DAB-64 dendrimeric polymer and with the lipophilic n-octadecylurethane hybrane hyperbranched polymer derivative (HYB). The solution before filtration had a concentration of 100 ppb while after filtration the concentration was at least 10 times lower.

The invention claimed is:
1. A method for encapsulating pollutants comprising:
  (a) modifying dendrimeric polymers having symmetric chemical structure of formula I and/or non-symmetric hyperbranched polymers of formula II to contain:
  at least one atom of a chemical element able to form three or more chemical bonds;
  at least one inorganic or organic linking group; and
  at least one aliphatic chain with more than 8 carbon atoms or at least one aromatic group or the combination of the aliphatic chain and the aromatic group, wherein the aliphatic chain or the aromatic group or the combination of the aliphatic chain and the aromatic group is introduced on the surface of the dendrimeric polymers or of the hyperbranched polymers;
  wherein the modifying renders the polymers lipophilic, and wherein the modified polymers form nanocavities from the internal chains of the dendrimeric polymers and from the external aliphatic chains or aromatic groups or combination of aliphatic chains and aromatic groups;
wherein formula I is represented as

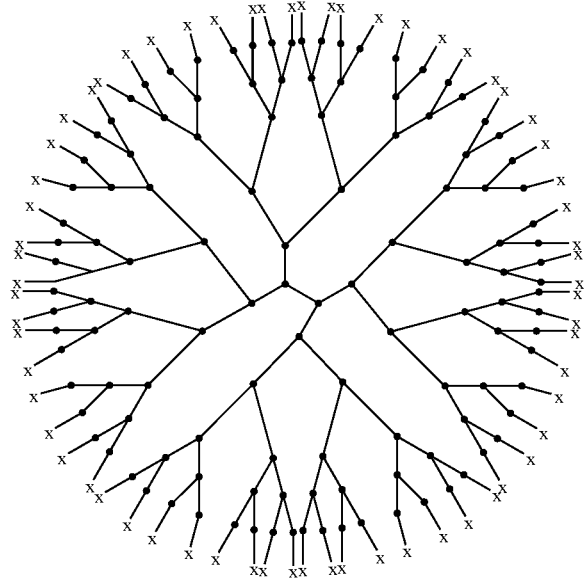

I and wherein formula II is represented as

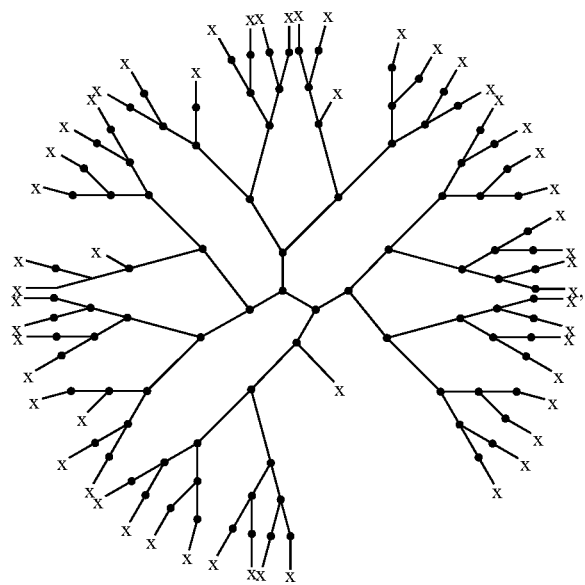

II wherein the symbol (●) represents an atom of a chemical element able to form three or more chemical bonds, the straight line (-) represents an inorganic or organic linking group and the symbol (X) represents an aliphatic chain with more than 8 carbon atoms or an aromatic group or the combination of the aliphatic chain and the aromatic group; and (b) introducing the modified dendrimeric polymers and/or modified non-symmetric hyperbranched polymers into a solution containing pollutants, wherein the pollutants are encapsulated in the nanocavities.

2. The method according to claim 1 wherein the atom of a chemical element able to form three or four chemical bonds is nitrogen.

3. The method according to claim 1 wherein the inorganic or organic linking group is aromatic or aliphatic or their combination.

4. The method according to claim 1 wherein the modified dendrimeric polymers are diaminobutane poly(propylene imino) dendrimers modified with lipophilic segments.

5. The method according to claim 1 wherein the modified non-symmetric hyperbranched polymers are derivatives that result from the polycondensation of succinic, pthalic or tetrahydropthalic anhydride with diisopropanolamine.

6. The method according to claim 1 wherein the modified polymers are added in powder form to the solution containing pollutants and wherein subsequently the solution is stirred and the modified polymers which have the encapsulated pollutants are removed by filtration or centrifugation or the combination of filtration and centrifugation.

7. The method according to claim 1 wherein a thin film is prepared from the modified polymers and the method further comprises covering a container with the thin film and adding the solution to the interior of the container for purification.

8. The method according to claim 1 wherein the product resulting from the modification of the polymers is employed for application to systems used for the purification of water.

9. The method according to claim 1 further comprising regenerating the lipophilic dendrimeric or hyperbranched polymer by protonation with a strong acid or by treatment with hot solvent under conditions that do not dissolve the dendrimeric polymer but do dissolve the absorbed lipophilic organic pollutants.

* * * * *